United States Patent [19]

Leighton

[11] 4,248,497
[45] Feb. 3, 1981

[54] TRUCKER MIRROR SPRAY DEFLECTOR

[76] Inventor: Robert E. Leighton, 1634 S. Willis, Abilene, Tex. 79605

[21] Appl. No.: 52,130

[22] Filed: Jun. 25, 1979

[51] Int. Cl.³ .............................................. G02E 11/04
[52] U.S. Cl. ....................................... 350/63; 98/2.17
[58] Field of Search ...................... 350/63; 98/2, 2.08, 98/2.01, 217

[56] References Cited

U.S. PATENT DOCUMENTS

| 2,561,778 | 7/1951 | Bohnenblust | 350/63 |
| 2,758,509 | 8/1956 | Owens | 350/63 |
| 3,667,369 | 6/1972 | Smith | 350/63 |

FOREIGN PATENT DOCUMENTS 2511290  9/1975  Fed. Rep. of Germany ............. 350/63

Primary Examiner—John K. Corbin
Assistant Examiner—B. Wm. de los Reyes
Attorney, Agent, or Firm—Harvey B. Jacobson

[57] ABSTRACT

A pair of upper and lower brackets are supported from the inner forward upstanding marginal edge portion of a side mounted vehicle rear vision mirror and a vertically elongated wind deflector panel assembly is supported from the brackets. The panel assembly includes a main deflector panel spaced between the vehicle side and the forward inner marginal portion of the mirror and also includes forward inner and rear outer upstanding marginal portions. The panel assembly additionally includes a secondary panel stationarily supported relative to the main panel, disposed on the outer side thereof and spaced between the main panel outer rear marginal portion and the mirror forward inner marginal portion. The main panel is rearwardly and outwardly inclined relative to the vehicle and the secondary panel is inclined relative to the main panel to define a forwardly opening obtuse angle therewith. The main and secondary panels are operative to deflect air toward the forward inner marginal portion of the associated mirror and the spacing between the secondary and main panels defines an exit slot through which rainwater incident upon the main panel may exit without being deflected by the secondary panel toward the mirror.

10 Claims, 4 Drawing Figures

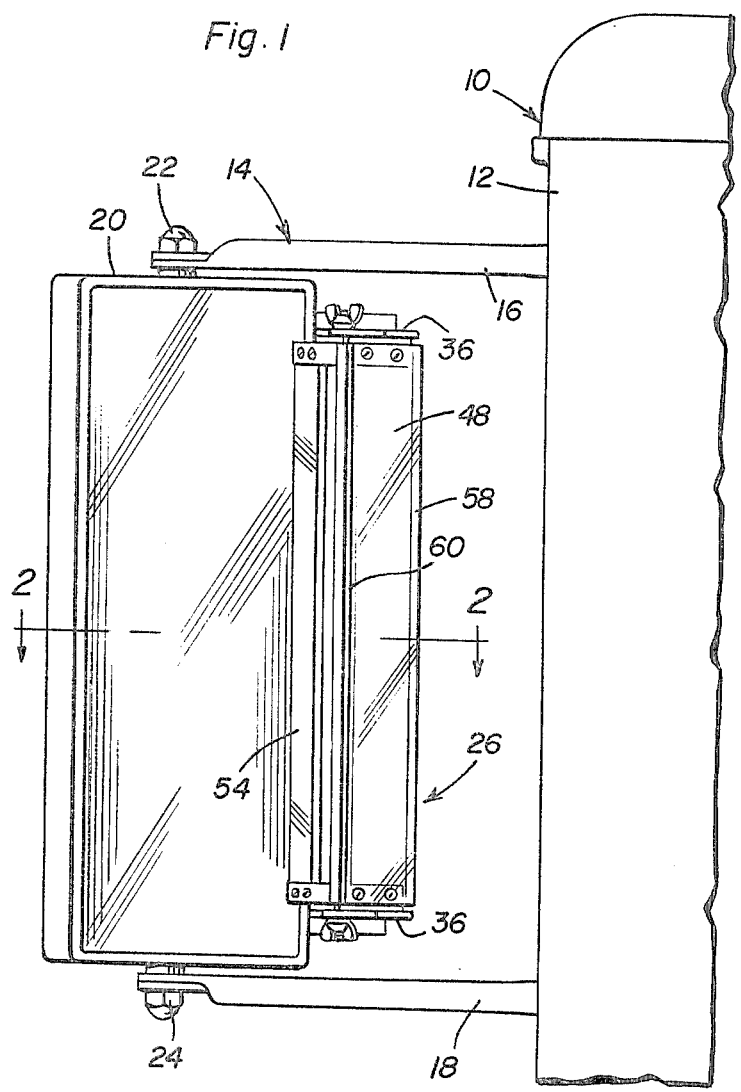
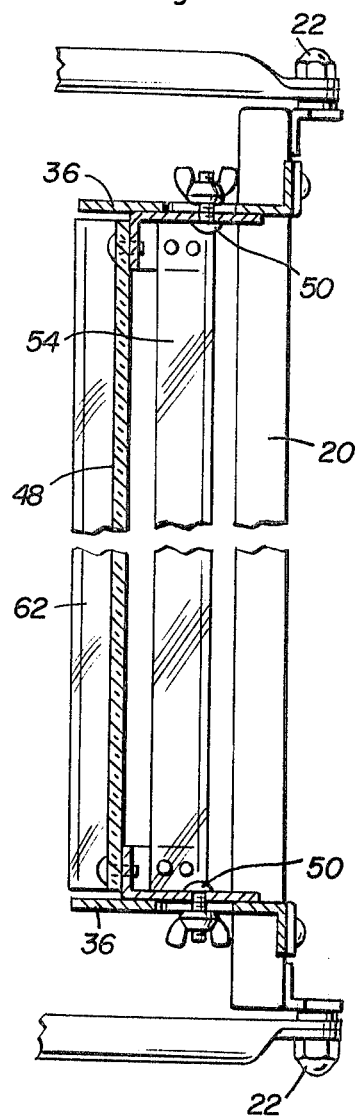
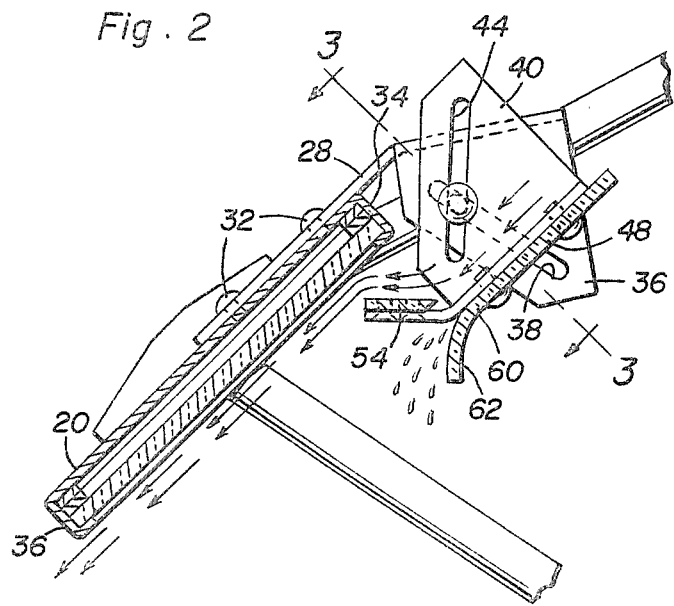
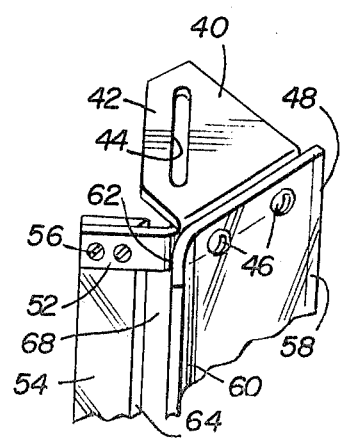

TRUCKER MIRROR SPRAY DEFLECTOR

BACKGROUND OF THE INVENTION

When driving a truck and other vehicles equipped with outwardly spaced side rear vision mirrors in the rain, the rear vision mirrors collect water spray thereon from adjacent vehicles and also due to air turbulence about the mirrors. The collection of rainwater upon an outside rear vision mirror limits the rearward vision afforded thereby and accordingly, a need exists for some form of structure which will be operative to prevent the collection of surface water on a rear vision mirror.

Various forms of devices for preventing the collection of surface moisture on rear vision mirrors have heretofore provided, such as those disposed in U.S. Pat. Nos. 2,758,509, 2,796,506, 3,059,540, 3,455,624 and 3,667,369. However, these previously known forms of structures for preventing the accumulation of water on rear vision mirrors, in some cases, do not perform in the most desirable manner.

BRIEF DESCRIPTION OF THE INVENTION

The spray deflector of the instant invention includes a pair of slightly horizontally spaced and relatively angulated panels for diverting air across the surface of a rear vision mirror and the spacing between the panels serves as a discharge slot for some of the air initially deflected from a first of the panel members toward the second panel member and also substantially all of the heavier droplets of water diverted by the first panel member, thus enabling the second panel member to divert substantially water droplet free air across the surface of the associated mirror.

The main object of this invention is to provide an effective air deflector for rear vision mirrors which will be operative to cause substantially water droplet free air to be deflected across the mirror surface of an associated rear vision mirror.

Another object of this invention is to provide an apparatus in accordance with the preceding objects and which may be readily added to rear vision mirrors presently being manufactured.

Still another object of this invention is to provide a spray diverter which may be readily adapted to existing rear vision mirrors.

A further important object of this invention is to provide a spray deflector constructed in a manner whereby its relative positioning and annulation relative to an associated rear vision mirror surface may be adjusted for optimum performance.

A final object of this invention to be specifically enumerated herein is to provide a rear vision mirror spray deflector in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary rear elevational view of a truck cab having a conventional "trucker" rear vision mirror supported therefrom and with the spray deflector of the instant invention operatively associated with the rear vision mirror;

FIG. 2 is a fragmentary horizontal sectional view taken substantially upon the plane indicated by the section line 2—2 of FIG. 3;

FIG. 3 is a fragmentary vertical sectional view taken substantially upon the plane indicated by the sectional line 3—3 of FIG. 1; and FIG. 4 is a fragmentary perspective view of the upper end portion of the panel assembly of the spray deflector.

DETAILED DESCRIPTION OF THE INVENTION

Referring now more specifically to the drawings, the numeral 10 generally designates a truck-type vehicle including a cab 12 having a truck mirror assembly referred to in general by the reference numeral 14 supported from the rear side of the cab 12.

The mirror assembly 14, as is conventional, includes horizontally outwardly projecting upper and lower support arms 16 and 18 between whose outer ends a vertically elongated generally rectangular mirror 20 is pivotally supported by means of pivot fasteners 22 and 24.

The spray deflector assembly of the instant invention is referred to in general by the reference numeral 26 and includes upper and lower brackets 28 secured to the upper and lower portions of the outer side of the mirror 20 by suitable fasteners 32. The mirror 20 includes forward inner and rear outer upstanding marginal portions 34 and 36 and the brackets 28 project forwardly of the forward marginal portion 34 and are angulated inwardly therefrom. The inner portions of the brackets 28 include vertically registered horizontal mounting plates 36 provided with registered elongated slots 38. In addition, the spray deflector assembly 26 includes a second pair of upper and lower mounting brackets 40 which are similar to the brackets 28 and include mounting plates 42 having elongated slots 44 formed therein.

The mounting plates 40 are secured, by fasteners 46, to the upper and lower marginal portions of a main deflector panel 48 and the upper and lower mounting plates 42 underlie and overlie, respectively, the upper and lower mounting plates 36 with the corresponding slots 38 and 44 registered with each other. A clamp-type pivot fastener 50 is secured through each pair of registered slots 38 and 44 and in this manner the mounting brackets 40 are supported from the mounting brackets 28 for angular displacement relative thereto about an upstanding axis, the pivot fasteners 50 serving to frictionally retain the mounting plates 42 in adjusted angulated positions. Also, it will be noted that inasmuch as the pivot fasteners 50 are each secured through a pair of corresponding registered slots 38 and 44, the pivot axis of oscillation of the mounting brackets 40 relative to the mounting brackets 28 may be adjusted toward and away from the mirror 20 as well toward and away from the main panel 48.

The mounting brackets 40 include angulated arms 52 to which the upper and lower ends of a secondary panel 54 are secured by fasteners 56. The main panel 48 includes inner forward and rear outer marginal portions 58 and 60 and the rear outer marginal portion terminates rearwardly in a smoothly rearwardly curving marginal portion 62.

From FIGS. 2 and 4 of the drawings, it may be seen that the inner marginal edge 64 of the secondary panel 54 is beveled and spaced from the rear outer marginal portion 60 of the panel 48 and that the secondary panel 54 is also spaced from the mirror 20.

With the spray deflector assembly 26 mounted and adjusted as illustrated in FIG. 2 of the drawings, forward movement of the truck 10 will cause the outer side of the panel 48 to be advanced against the air through which the truck is moving and that air, as well as droplets of water therein, to be deflected rearwardly along the forward side of the panel 48. A portion of the deflected air passes between the panels 48 and 54 and carries therewith the heavier droplets of water which impact with the front side of the panel 48. However, a large portion of the air deflected by the front side of the panel 48 will be further deflected by the panel 54 toward the front marginal portion 34 of the mirror 20 and cause substantially water droplet free air to pass across the reflective surface of the mirror 20 to thus maintain the latter free of accumulation of water droplets thereon.

Because the water droplets contained in the air incident upon the forward surface of the panel 48 are considerably heavier than the air being deflected by the panel 48, that water will move rearwardly across the front side of the panel 48 and outwardly through the slot 68 defined between the panel 48 and the panel 54. Further, due to the rearwardly curving rear marginal portion 62 of the panel 48 at least a majority of the water incident upon the front side of the panel 48 will be directed away from the mirror 20. Of course, the air further deflected by the panel 54 is substantially free of water droplets therein and thereby moves rapidly across the reflective surface of the mirror 20 to blow any accumulation of water spray therefrom and without causing additional water to be deposited thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an upstanding rear view mirror of the type adapted for securement to an associated vehicle in outwardly spaced relation relative to one side of said vehicle, and thus including forward inner and rear outer upstanding marginal portions adjacent and remote, respectively, said vehicle said, upper and lower mounting brackets supported from said mirror, a vertically elongated wind deflector panel assembly supported from said brackets, said panel assembly including a main deflector panel spaced between said one vehicle side and the forward inner marginal portion of said mirror and also including forward inner and rear outer upstanding marginal portions and a secondary panel stationarily supported relative to said main panel, disposed on the outer side thereof and spaced between said main panel rear outer marginal portion and said mirror forward inner marginal portion, said main panel being rearwardly and outwardly inclined relative to said vehicle, said secondary panel being inclined relative to said mirror to define a forwardly opening acute angle therewith and relative to the main panel to define a forwardly opening obtuse angle therewith, the spacing between the rear outer marginal portion of said main deflector panel and said secondary panel defining a water droplet discharge slot, whereby substantially all of the water droplets in the air flow incident upon the main deflector panel and subsequently deflected therefrom onto and across the secondary panel for discharging therefrom across the mirror will be removed from the deflected air and discharged through said slot.

2. The combination of claim 1 wherein said main panel projects rearwardly of the forward inner marginal portion of said secondary panel and the rear outer marginal portion of said main panel curves smoothly rearwardly.

3. The combination of claim 1 wherein said main panel is constructed of transparent material.

4. The combination of claim 3 wherein said secondary panel is constructed of transparent material.

5. The combination of claim 1 wherein said panel assembly and brackets include coacting structure supporting said panel assembly from said mirror for angular displacement relative thereto about an upstanding axis.

6. The combination of claim 5 wherein said coacting structure includes means operative to horizontally shift said axis in any selected horizontal direction relative to said mirror.

7. The combination of claim 5 wherein said coacting structure includes means operative to horizontally shift said axis in any selected horizontal direction relative to said panel assembly.

8. The combination of claim 7 wherein said coacting structure includes means operative to horizontally shift said axis in any selected horizontal direction relative to said mirror.

9. The combination of claim 8 wherein said main panel projects rearwardly of the forward inner marginal portion of said secondary panel and the rear outer marginal portion of said main panel curves smoothly rearwardly.

10. The combination of claim 9 wherein said main panel is constructed of transparent material.

* * * * *